Dec. 4, 1945.    H. P. TRUSTY    2,390,230
AUTOMATIC PARACHUTE DELIVERY MECHANISM FOR AIRCRAFT
Filed June 19, 1942    4 Sheets-Sheet 1
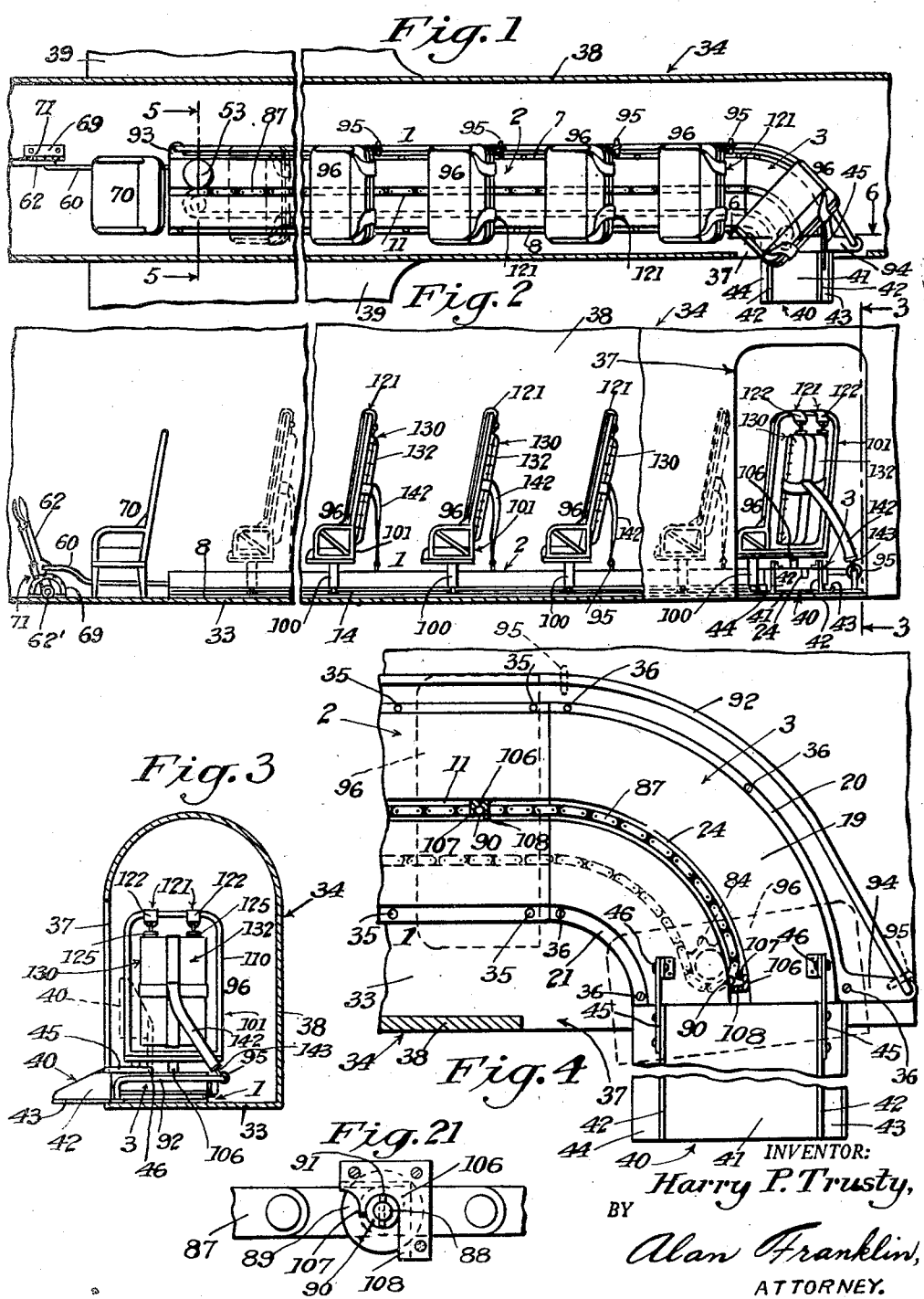
INVENTOR:
Harry P. Trusty,
BY
Alan Franklin,
ATTORNEY.

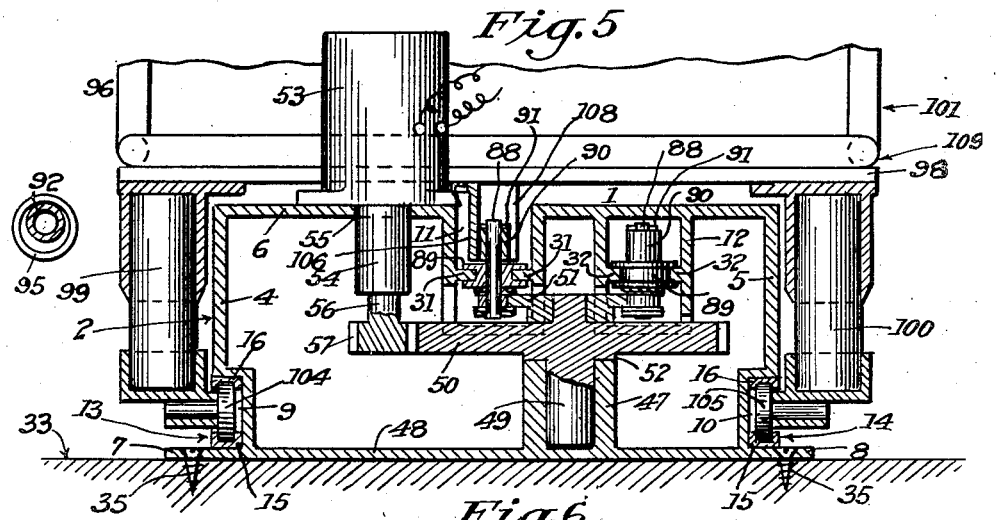
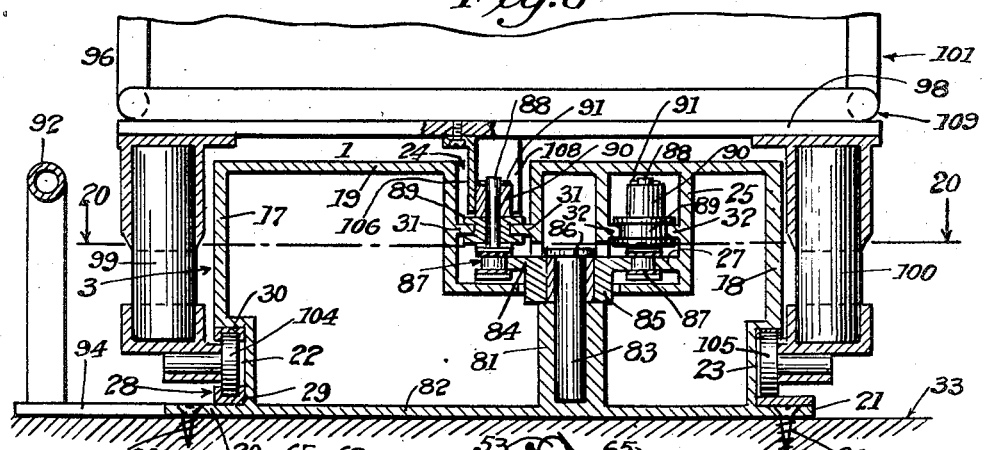
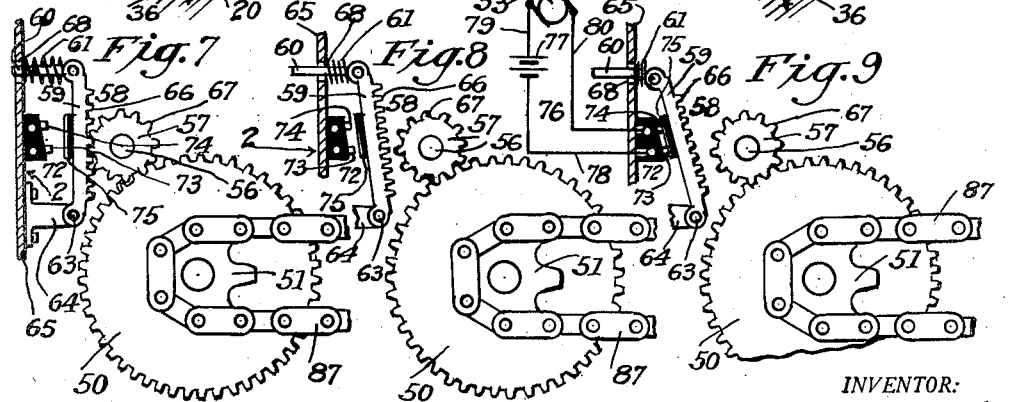

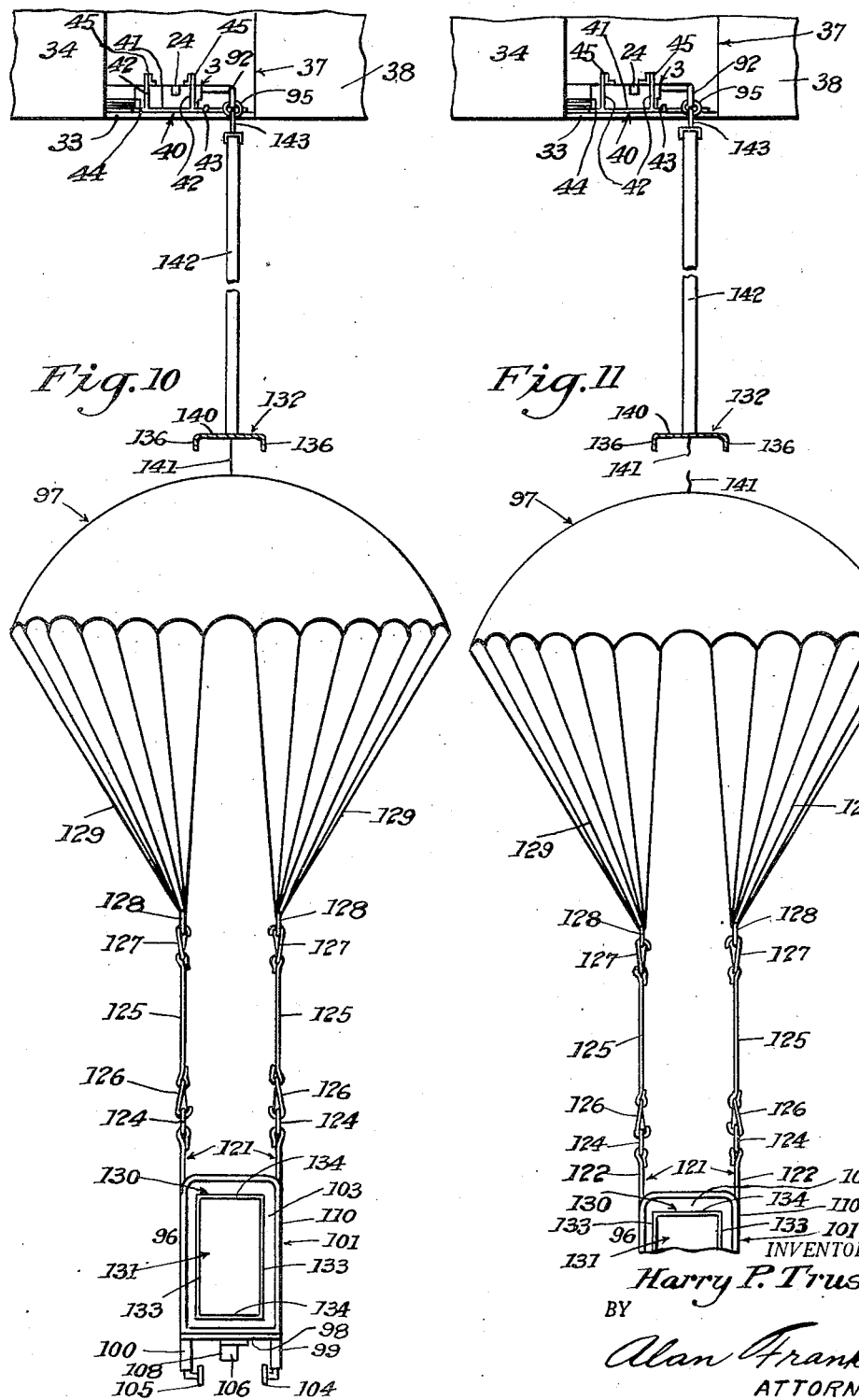

Dec. 4, 1945. H. P. TRUSTY 2,390,230
AUTOMATIC PARACHUTE DELIVERY MECHANISM FOR AIRCRAFT
Filed June 19, 1942 4 Sheets-Sheet 4
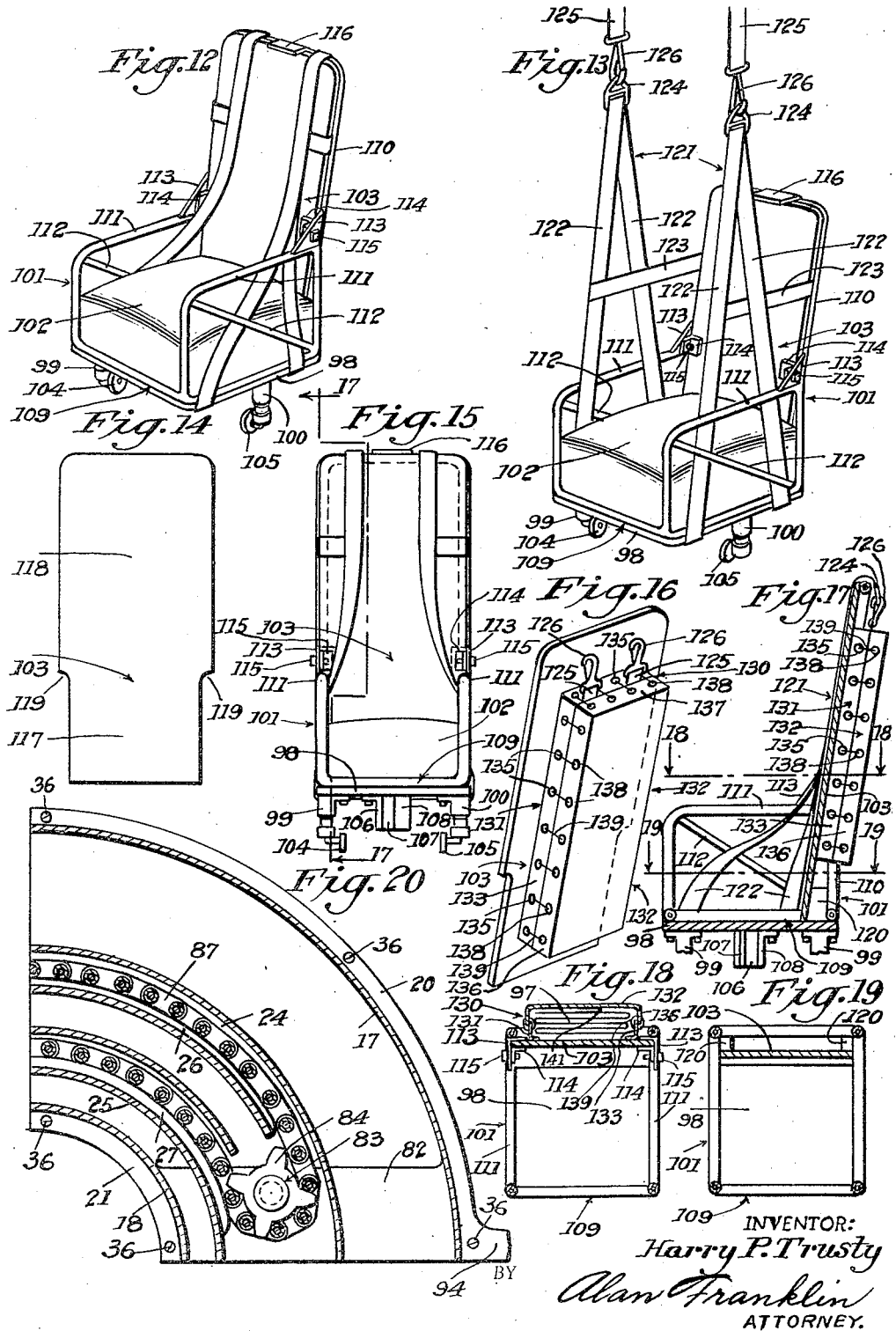

Patented Dec. 4, 1945

2,390,230

UNITED STATES PATENT OFFICE 2,390,230

AUTOMATIC PARACHUTE DELIVERY MECHANISM FOR AIRCRAFT

Harry P. Trusty, Los Angeles, Calif.

Application June 19, 1942, Serial No. 447,618

11 Claims. (Cl. 244—137)

This invention is an automatic parachute delivery mechanism for aircraft, and it is an improvement on my invention covered by my United States Letters Patent No. 1,859,542, May 24, 1932, for Life preserving mechanism for airships.

The general object of this invention is to provide an improved parachute delivery mechanism for aircraft controlled by the pilot of an aircraft, whereby passengers, mail or freight, may be automatically, quickly and safely delivered from the aircraft with parachutes, at any suitable altitude, and particularly at low altitudes.

Another object is to provide a mechanism of the character stated which may be readily installed in a conventional transport airplane.

Other objects and advantages will appear hereinafter.

The invention is illustrated in the annexed drawings, which form a part of this specification, and in which:

Fig. 1 is a plan view of my invention shown installed in an airplane, with the airplane shown in horizontal section.

Fig. 2 is a side elevation of my invention, as shown in Fig. 1, with the airplane shown partly in longitudinal section and partly in side elevation.

Fig. 3 is a rear end elevation of my invention with the airplane shown in transverse vertical section taken on line 3—3 of Fig. 2.

Fig. 4 is a plan view on an enlarged scale of the rear-end portion of the parachute carrier mounting of my invention.

Fig. 5 is a transverse vertical section of my invention taken on line 5—5 of Fig. 1.

Fig. 6 is a transverse vertical section of my invention taken on line 6—6 of Fig. 1.

Fig. 7 is a plan view of the lock for locking my invention against operation, and the switch for closing the motor circuit to operate my invention, with the lock shown in locking position and the switch in open position breaking the motor circuit.

Fig. 8 is a view like Fig. 7, but with the lock shown in unlocked position and the switch shown in open position.

Fig. 9 is a view like Fig. 7, but with the lock shown in unlocked position and the switch shown closed, closing the motor circuit.

Fig. 10 is an elevation showing one of the carriers and its parachute dropped from the plane into space with the static cord drawn taut and the parachute open, but before the light cord, connecting the parachute to the parachute container cover is broken.

Fig. 11 is a view like Fig. 10, but with the light cord, connecting the parachute to the parachute container cover, broken, and the carrier and parachute free and dropping through space.

Fig. 12 is a perspective of one of the carriers with its parachute packed on the back thereof, in which condition the carrier and its parachute are mounted in the plane to be dropped therefrom when so desired.

Fig. 13 is a perspective of one of the carriers when dropped from the plane, with its parachute drawn out of its container on the back of the carrier, and the carrier harness connected to the lower ends of the risers, which are connected at their upper ends to the shroud lines of the parachute.

Fig. 14 is a front view of the back plate of one of the carriers, on the back of which plate is packed the parachute of the carrier.

Fig. 15 is a front view of one of the carriers with its back plate and parachute secured therein, and with its harness extended upwardly over the upper edge of said back plate and connected to the parachute on the back of said plate.

Fig. 16 is a perspective of one of the carrier back plates and the parachute mounted on the back thereof.

Fig. 17 is a vertical section taken on line 17—17 of Fig. 15 of one of the carriers with its back plate and parachute mounted thereon.

Fig. 18 is a horizontal section of one of the carriers and its back plate and parachute mounted thereon, taken on line 18—18 of Fig. 17.

Fig. 19 is a horizontal section of the carrier taken on line 19—19 of Fig. 17.

Fig. 20 is a horizontal section of the rear section of the carrier mounting, taken on line 20—20 of Fig. 6.

Fig. 21 is a horizontal section on an enlarged scale of one of the carrier pusher catches in engagement with a roller on the carrier conveyor chain.

Referring more particularly to the drawings in which corresponding parts are designated by the same reference characters in all of the figures, I indicates an elongated parachute carrier mounting comprising a straight section 2, and a curved rear end section 3. Said straight section 2 is formed with side walls 4 and 5 and a top wall 6, and said side walls are formed at their lower edges with external base flanges 7 and 8, respectively, and with track grooves 9 and 10, respectively, in their outer sides adjacent said base flanges while the upper wall 6 is formed with a depressed chain channel 11, and with a chain housing 12 on the under side of said upper wall, which channel and housing extend longitudinally of the section 2 in parallel relation.

In the grooves 9 and 10 of said side walls 4 and 5. respectively, are arranged wheel tracks 13 and 14. comprising lower and upper channel rails 15 and 16, which are secured to said side walls in said grooves in any suitable manner. The curved end section 3 of the parachute carrier mounting 1 is formed with an outer curve side wall 17 and an inner curve side wall 18, and with an upper wall 19, and said side walls are formed at their lower edges with external base flanges 20 and 21, respectively, and with grooves 22 and 23, respectively, in their outer sides adjacent said base flanges, while said upper wall 19 is formed with a depressed chain channel 24, and with a chain housing 25 on the under side of said upper wall, said channel and said housing being in curved parallel relation to each other and to the curvature of said section 3, the chain channel 24 extending through the rear end of said curved section (Fig. 4). On the inner curved side wall of the channel 24 is formed a chain guide track 26 extending horizontally inwardly into said channel, and on the inner curved side wall of the chain housing 25 is formed a chain guide track 27 extending horizontally inwardly into said housing. for the purpose hereinafter more fully described. In the groove 22 of the outer curve side wall 17 is arranged a wheel track 28 comprising a lower channel rail 29 and an upper channel rail 30 secured to said side wall in any suitable manner. The channels 11 and 24 of the sections 2 and 3 of the mounting 1 are formed with internal flanges 31 while the housings 12 and 25 are formed with internal flanges 32 extending lengthwise thereof. The straight section 2 of the parachute carrier mounting 1 is detachably secured to the floor 33 of an airplane 34. longitudinally of the plane. by screws 35 driven through the base flanges 7 and 8 of said section into the plane floor. The curved end section 3 of the parachute carrier mounting 1 is detachably secured to the floor 33 of the plane 34 by screws 36 driven through the base flanges 20 and 21 of said curved end section into the plane floor, with the forward end of said curved end section adjacent to and in registration with the rear end of the straight section 2 of the parachute carrier mounting 1, and the rear end of said curved end section extending to the door 37 in one side of the cabin 38 of the plane 34. rearwardly of the plane wing 39. at said side of the plane. in which position of said curved end section the rear ends of the chain channel 11. chain housing 12. track grooves 9 and 10 and track 13 of the straight section 1 register with the forward ends of the chain channel 24. chain housing 25. track grooves 22 and 23. and track 28. respectively of the curved end section 3 of the parachute carrier mounting 1. On the rear end of the curved end section 3 of the parachute carrier mounting 1 is pivotally mounted an apron 40 to be swung down into its operative position extending outwardly from said rear end of said curved section through the door 37 of the plane cabin. as shown in Figs. 1, 3, 4, 10 and 11 of the drawings, or to be swung up into its inoperative position within the plane cabin, as shown in dotted lines in Fig. 3. said apron comprising a bottom wall 41 side guide walls 42 upstanding from said bottom wall, and tracks 43 and 44 extending from said bottom wall, and outstanding beyond said side walls, respectively, there being a pair of arms 45 secured at their rear ends to said side walls 42, respectively, and extending forwardly over the upper wall 19 of the curved section 3 of the parachute carrier base 1 and pivoted at their forward ends, respectively, at 46 to the upper wall of said curved section 3, so that the forward ends of the bottom wall 41 and side walls 42 will engage the rear end of said curved end section 3 and arrest the apron in its operative position when swung down, as shown in Figs. 1 and 3. The track 43 is grooved.

A bearing 47 is secured at its lower end upon a cross bar 48 which extends across the forward end portion of the section 2 of the parachute carrier mounting 1, at the lower side of said section, and is secured at its ends to the lower part of the side walls 4 and 5 respectively of said section 2, and in said bearing 47 is turnably mounted a drive journal 49 on the upper end of which are formed a drive gear 50 and a drive sprocket 51 above said drive gear, the lower sides of the hub 52 of said drive gear and sprocket resting upon the upper end of said bearing 47 and turnably supporting the drive gear 50 and the drive sprocket 51 on the upper end of said bearing 47, and turnably supporting the journal 49 in said bearing. On the upper wall 6 of the straight section 2 of the parachute carrier mounting 1, near the forward end of said section, is mounted an electric motor 53, the bearing 54 of which extends downwardly through an opening 55 in said upper wall into said section 2, and the motor shaft 56 journaled in said bearing extends downwardly below said bearing and carries on its lower end a drive pinion 57 in mesh with the drive gear 50. A lock 58 is provided for normally locking my mechanism against operation, which lock includes a locking arm 59, a connecting rod 60, a detension spring 61, and an operating lever 62. The locking arm 59 is pivoted at one end at 63 on a bracket 64 secured to the inner side of the front end wall 65 of the section 2 of the carrier mounting 1, and a series of teeth 66 are formed on the rear edge of said locking arm 59 for engaging the teeth 67 of the motor drive pinion 57 for locking said pinion against rotation. To the swinging end of the locking arm 59 is connected the rear end of the rod 60, which extends forwardly through an opening 68 in said front end wall 65 of the section 2 of the parachute carrier mounting 1, and the forward end of said rod is connected to the operating lever 62, which is pivoted at 62' to a bracket 69 secured to the floor 33 of the airplane 34 within convenient reach of the pilot's seat 70 of the plane. A conventional lock 71 is provided for locking said releasing lever 62 in lock-releasing position. The spring 61 surrounds the connecting rod 60 between the swinging end of the locking arm 69, to which said rod is connected, and the front wall 65 of the section 2 of the parachute carrier mounting 1, which spring normally holds said locking arm 69 with its teeth 66 in mesh with the teeth 67 of the motor drive pinion 57.

The motor 53 is controlled by a switch 72 comprising a pair of contacts 73 and 74 mounted on the front wall 65 of section 2 of carrier mounting 1, and a bridge contact 75 mounted on the locking arm 59, the motor circuit 76 including a generator 77, the motor 53 and the switch 72, there being a lead 78 extending from the switch contact 73 to one pole of generator 77, a lead 79 extending from the other pole of said generator to one terminal of the motor 53, and a lead 80 extending from the other terminal of said motor to the switch contact 74.

A sprocket mounting 81 is secured at its lower end upon a cross bar 82, which extends across the lower side of the curved section 3 of the carrier mounting 1, at the rear outer end of said section, and said cross bar is secured at its ends to the lower part of the side walls 17 and 18, respectively, of said section, and in said sprocket mounting 81 is fitted a journal 83, on the upper end of which is turnably fitted a sprocket 84, formed on its lower side with a hub 85 turnably resting upon the upper end of said socket mounting 81, there being a head 86 on the upper end of said journal 83 resting adjacent the upper side of said sprocket 84, whereby said sprocket is journaled for rotation in its operative position. An endless chain 87 extends over the drive sprocket 51 and over the sprocket 84 through the channel 11 and housing 12 in the straight section 2 of the carrier mounting 1, and through the chain channel 24 and chain housing 25 of the curved section 3 of said carrier mounting, with the inner sides of said chain engaging the curved guide tracks 26 and 27 for guiding said chain through the curved chain channel 24 and the curved chain housing 25 of said curved section 3 of said carrier mounting 1, there being a plurality of studs 88 secured to said chain and upstanding therefrom at a suitable distance apart, within the chain channel 11 and chain housing 12 of the section 2, and the chain channel 24 and chain housing 25 of the section 3 of the carrier mounting 1, with the upper ends of said studs resting below the upper walls 6 and 19 of said sections, for the purpose hereinafter described. On the studs 88 are journaled grooved rollers 89 which rest upon the upper side of the chain 87 and receive the internal flanges 31 in the channels 11 and 24 and the internal flanges 32 in the chain housings 12 and 25, whereby the lower sides of the grooves of said rollers engage the under side of said flanges 31 and 32 and prevent the chain from being lifted out of said channels and housing, while the upper sides of the grooves of said rollers engage the upper side of said flanges 31 and 32 and prevent sagging of said chain between the sprockets 51 and 84. Cylindrical rollers 90 are also journaled on the studs 88 above the grooved rollers 89 and rest at their lower ends upon the upper side of said flanged rollers. Pins 91 extend through the upper ends of the studs 88 over the upper ends of the cylindrical rollers 90 and prevent upward movement of said rollers 90 and the ground rollers 89 on said studs.

A ring guide rod 92 extends along the parachute carrier mounting 1 a short distance outwardly from one side of the straight section 2 and the outer curved side of the curved section 3 of said mounting, with the forward end of said rod secured in an arm 93 outstanding from said side of said straight section 2, at the forward end of said section, and with the rear end of said guide rod extended downwardly and secured to an arm 94 extending outwardly from the base flange 20 of said curved section 3 of said carrier mounting 1, the rear end portion of said guide rod diverging outwardly from the outer curved side of said curved section 3 of said carrier mounting. A plurality of rings 95 of somewhat larger diameter than the diameter of the guide rod 92 are slidably carried by said guide rod for the purpose hereinafter described.

On the carrier mounting 1 are mounted a plurality of parachute carriers 96 to travel from one end of said mounting to the other and to be dropped off the rear end of said mounting out of the plane 34, which carriers may be of any suitable design or form, and are shown in the form of chairs in which persons such as passengers or soldiers may sit, and which may be converted into carriers for freight, mail or other cargo, and to said carriers are respectively connected parachutes 97 in the manner to be described. Each of said carriers 96 as illustrated, includes a base plate 98, mounted on legs 99 and 100, an upright chair frame 101 secured on said base plate, a cushion seat 102 detachably supported upon said base plate, and a back plate 103 detachably mounted in the back part of said frame 101. The base plate 98 is secured at one side on the upper ends of two legs 99 and at its other side on the upper end of a single leg 100, the legs 99 being spaced apart and said base plate being secured near its front edge and near its rear edge to the upper ends of said legs 99, respectively, while said base plate is secured intermediate its front edge and its rear edge to the upper end of said single leg 100. The legs 99 are mounted at their lower ends on swiveled wheels 104 which travel in the tracks 13 and 28 on one side of the straight section 2 and on the outer curved side of the curved section 3, respectively, of the parachute carrier mounting 1, while the leg 100 is mounted at its lower end on a wheel 105, which travels in the track 14 on the other side of the straight section 2 and on the base track flange 21 on the inner curved side of the curved section 3 of said parachute carrier mounting 1 and said wheels 104 and 105 travel over the apron 40 when said wheels leave the rear ends of said track 28 and said base track flange 21, respectively.

To the under side of the base plate 98 of each carrier 96 is secured a forked-shaped carrier pusher catch 106 which extends downwardly from said base plate, and is adapted to extend downwardly into the channels 11 and 24 in the sections 1 and 3, respectively of the parachute carrier mounting 1, to be engaged by a roller 90 on the chain 87 for pushing the carrier rearwardly along said mounting 1, said fork-shaped catch being formed with a short prong 107 and a long prong 108 which are disposed transversely of the carrier, with the short prong forwardly of the long prong, between which prongs said catch 106 receives the roller 90 on the chain 87, so that when the chain is at rest said prongs engaging said roller, will hold the chair against forward movement and rearward movement, respectively, on the mounting 1, but when the chain 87 is driven by the motor 53 through drive sprocket 51 the roller 90 engages the long prong 108 of catch 106 and pushes the chair rearwardly along the mounting 1 to the rear sprocket 84, where said roller travels around said rear sprocket and escapes the end of said long prong, whereupon the carrier continues rearwardly until it passes off the rear end of the mounting 1 and the catch 106 passes out of the rear end of channel 24. The chair frame 101 is constructed of light metal tubing and includes a rectangular base member 109, an upstanding inverted U-shaped back member 110, arms 111, and diagonal arm braces 112. The back member 110 extends upwardly from the rear of the base member 109, the lower ends of the side rails of said back member being secured to the rear corners, respectively, of said base member. The arms 111 are secured, respectively, at their rear ends to the side rails of the back member 110 at a suitable distance above the base member 109 and extend forwardly from said side rails and are bent downwardly and secured at their lower forward ends to the front corners of said base member 109.

The upper portion of the back member 110 is strengthened against rearward pressure by angle-iron gussets 113 at the junctions of said back member and the arms 111, which gussets are secured to the upper sides of said arms, respectively and to the front sides of the side rails, respectively, of said back member. Angle iron stops 114 are secured by screws 115 to the inner sides of the gussets 113 respectively, for the purpose hereinafter described. The chair frame 101 is braced by a pair of integral diagonal braces 112, each of which extends from the junction between a rear corner of the base member 109 and the lower end of the adjoining side rail of the back member 110, to the forward downwardly-bent portion of the arm 111, which arm extends forwardly from said side rail of said back member, the brace 112 being secured, at its rear lower end, to said rear corner of said base frame and adjoining lower end of said side rail of said back member, and secured, at its forward upper end, to the forward curved end of said arm 111. The back member 110 is inclined slightly rearwardly from the arms 111.

A stop plate 116 is secured to the upper side of the upper connecting rail of the U-shaped back member 110 of the chair frame 101, and extends forwardly a short distance from said connecting rail for the purpose hereinafter described. The back plate 103 is formed with a lower portion 117 slightly narrower in width than its upper portion 118 and with shoulders 119 between the meeting ends of the side edges of said narrower lower portion, and the side edges of said wider upper portion, so that said back plate may be detachably placed in the back part of the chair frame 101, with the lower narrower portion 117 of said back plate 103 fitting between the arms 111 of the chair frame and fitting at its lower end between the side rails of the base frame member 109 against the stops 120 in the rear lower corners of the chair frame and with the upper wider portion 118 of the back plate resting, at its side edge portions against the side rails of the back frame member 110, and at its upper edge portion, against the upper cross connecting rail of said back frame member, and with the shoulders 119 of said back plate resting upon the arms 111, and the upper edge of said back plate resting under and adjacent the stop plate 116, projecting forwardly from the upper cross rail of the back frame member 110, said stop plate preventing upward movement of said back plate with relation to the chair frame 101. The angle-iron stops 114 are secured to the gussets 113 by the screws 115 in engagement with the front side of the back plate 103 to hold said plate in position in the rear of the chair frame 101 as aforesaid.

Each carrier 96 is secured in a parachute suspension harness 121 which comprises a pair of suspension straps 122, a pair of connecting straps 123 and a pair of D-rings 124 to which the opposite ends of said suspension straps are respectively connected, said suspension straps extending transversely, in spaced relation under the base frame member 109 of the carrier 96 and converging upwardly along the inner sides of the carrier frame to said D-rings 124, and said connecting straps 123 being connected at their forward portions to said suspension straps 122 at the sides, respectively, of the carrier, and at their rear ends to the side rails of the back member 110 of the chair frame 101, near the upper end of said back member, which connecting straps hold the carrier in its proper position in its harness 121 and prevent the carrier from swinging backwardly in said harness.

Each carrier 96 is detachably connected to a parachute 97 by means of its harness 121 and risers 125, there being snap hooks 126, on the lower ends of said risers, engaging the D-rings 124 of the harness 121, and there being snap hooks 127 on the upper ends of said risers 125 engaging rings 128 to which the lower ends of the parachute shroud lines 129 are connected. The parachute 97 when not in use is contained within a container 130 mounted on the rear side of the back plate 103 of the carrier 96, the upper end portions of the harness 121 extending rearwardly over the upper end of said back plate and the back member 110 of the chair frame 101, with the snap hooks 126 of risers 125 engaging the D-rings 124 of said harness. The parachute container 130 comprises a stationary member 131, secured to the rear side of the back plate 103, and a detachable cover member 132 fitted over said stationary member, said stationary member being formed with outstanding side walls 133 and end walls 134, in which walls are a plurality of spaced eyelets 135, and said cover member being formed with inturned side walls 136 and end walls 137 in which walls are a plurality of spaced eyelets 138, through which eyelets is laced a light cord 139, whereby said cover member 132 is detachably held in position over said stationary member 131 enclosing the parachute 97 in the container 130. The parachute 97 is connected at its upper end, in the center of the top thereof, to the inner side of the outer wall 140 of the detachable cover member 132 by a light cord 141. A static strap 142 is secured at one end to the detachable cover member 132, and a snap hook 143 is secured to the other end of said strap and is connected to one of the rings 95 on the guide rod 92.

The operation, uses and advantages of my invention are as follows:

To place the parachute carriers 96, with their parachutes 97 packed on the back thereof, in position on the parachute carrier mounting 1 in the plane 34, the operating lever 62 is first swung on its fulcrum 69 until the lock arm 59, through the connecting rod 60, is swung on its pivot 63 sufficiently to disengage the teeth 66 on said lock arm from the teeth 67 of the motor pinion 57, but not sufficiently to close the motor switch 72, and said lock arm 59 is held in such position with its teeth 66 disengaged from the teeth 67 of the motor pinion 57, while the motor switch 72 is held open by the lock 71 of said operating lever 62; the apron 40 being swung down on its pivots 46 into its operative position, extending outwardly through the open door 37 of the plane 34, a carrier 96 with its parachute 97 connected thereto and packed on the back thereof, is then placed upon the apron 40 with the carrier wheels 104 resting in the grooved track 43 at one side of said apron and the carrier wheel 105 resting upon the flat track 44 at the other side of said apron; the carrier 96 is then moved over said apron with its wheels 104 rolling in said grooved track 43 and its wheel 105 rolling along said flat track 44, until the carrier wheels 104 roll into the track 20 and the carrier wheel 105 rolls onto the flat track 21 of the curved section 3 of the mounting 1, and the pusher catch 106 depending from the base plate 98 of said carrier enters the channel 24 of said section 3 of said mounting 1, through the rear end of said channel, and said pusher catch engages the roller 90 on one of the studs 88 upstanding from the chain 82, between the fork arms 107 and 108 of said catch, as shown in Figs. 4 and 6 of the drawings; said carrier is then moved forwardly around said curved section 3 with its wheels 104 rolling along the channel track 28 and its wheel 105 rolling along the flat track 21 of said curved section, and with the catch 106 of said carrier engaging said roller 90 of said stud 88, and moving the chain 87 around the sprockets 51 and 84, until the carrier wheels 104, and the carrier wheel 105, respectively, of said carrier, are rolled into the rear ends of the channel tracks 13 and 14 of the straight section 2 of the carrier mounting 1 and said carrier is moved over the rear end of said straight section; another carrier 96, with its parachute 97 mounted thereon, is then placed upon and moved over the apron 40 until said carrier is moved over the rear end of the curved section 3 of the mounting 1 and the pusher catch 106 of said carrier is moved into the rear end of the channel 24 of said curved section into operative engagement with the roller 90 on the next stud 88 on the chain 87 at the rear of the stud 88 having its roller engaged by the pusher catch 106 of said first carrier 96 placed on the mounting 1 as aforesaid; said first carrier and said second carrier are then moved forwardly along the mounting 1, with the first carrier on the straight section 2 of said mounting, until the second carrier is moved from the curved section 3 over the rear end of said straight section of said mounting, the chain 87 being moved over its sprockets by the pusher catches 106 of said carriers engaging the rollers 90 on said studs 88 of said chain; the remaining carriers are then successively placed upon the apron 40 and moved over said apron and over the curved section 3 of the carrier mounting 1, with the pusher catches 106 of said carriers engaging the rollers 90 on the succeeding studs 88 of the chain 87 and moving said chain over the sprockets 51 and 84 as aforesaid, until all of said carriers are in their proper positions on the straight section 2 of the carrier mounting 1, with the first carrier at the forward end of said straight section and the last carrier at the rear end of said straight section of said mounting; the lock 71 of the operating lever 62 is unlocked and the spring 61 thrusts the connecting rod 60 rearwardly, which swings said operating lever into its initial position and the locking arm 59 rearwardly until the teeth on said arm engage the teeth 67 of the motor pinion 57 and lock said pinion against rotation, which locks the drive sprocket 51 against rotation and the chain 87 against longitudinal movement whereby the carriers 96 are locked against longitudinal movement along the mounting 1, the short forward prongs 107 of the carrier pusher catches engaging the rollers 90 on the said studs 88 and preventing forward movement of the carriers, and the long rear prongs 108 of said catches engaging said rollers and preventing rearward movement of said carriers along the mounting 1; the rings 95 are spaced along the guide rod 92 opposite the rear of the carriers 96, respectively, and the snap hooks 143 on the ends of the static cords 142 of the parachutes 97 on the backs of the carriers are snapped into said rings, respectively. The carriers 96 are then occupied by passengers, or mail or freight is suitably packed therein, and the plane may then take off from the ground.

When it is desired to let the carriers 96, with passengers, mail or freight therein, out of the plane, in the parachutes 97, the apron 40 is swung down and out through the plane door 37 and the pilot of the plane, or his assistant, swings the operating lever 62 until the lock arm 59, through connecting rod 60, is swung away from the motor pinion 57 and the teeth 66 of said arm are disengaged from the teeth 67 of said pinion, unlocking said pinion, and the switch 72 is closed, whereupon the motor 53 is driven by the generator 77, through lead 79, lead 80, switch 72 and lead 78, and the motor pinion 57 is rotated, which rotates the gear 50 and the drive sprocket 51, and said sprocket drives the chain 87 rearwardly through the channels 11 and 24 in the straight section 2 and curved section 3, respectively, of the carrier mounting 1, whereupon the rollers 90 on the studs 88 on the chain 87, in engagement with the carrier pusher catches 106, engage the longer rear prongs 108 of said catches and push said carriers rearwardly over the straight section 2 and the curved section 3 of the carrier mounting 1, out of the plane 34 through its open door 37 and over the apron 40 into space, the carrier wheels 104, at one side of the carriers 96, traveling in the channel track 13 at one side of the straight mounting section 2, in the channel track 28 along the outer curve side of the curved mounting section 3, and in the grooved track 43 at one side of the apron 40, and the carrier wheel 105, at the other side of the carrier 96, traveling in the channel track 14 at the other side of the straight mounting section 2, on the flat track 21 at the inner curve side of the curved mounting section 3, and on the flat track 44 at the other side of the apron 40, while the static cords 142, connected to the parachute container covers 132 on the backs of the carriers 96 and to the rings 95, respectively, draw said rings rearwardly along the guide rod 92 to the rear end of said rod, as said carriers are pushed rearwardly over the mounting 1, as aforesaid; and as the carriers 96 travel from the rear end of the curved mounting section 3 the rollers 90 on the chain studs 88, traveling around the rear sprocket 84, escape the long prongs 108 of the carrier pusher catches 106 successively, and said catches pass out of the rear end of the chain channel 24 in said curved mounting section 3. When the rearmost carrier 96 has traveled outwardly over the apron 40 said carrier drops into space and the static cord 142, connected to the cover 132 of the parachute container on the back of said carrier, draws the ring 95, connected to the outer end of said static cord, to the rear end of the guide rod 92, where said end of said rod is connected to the arm 94 extending from the curved mounting section 3; and as said static cord is drawn taut between said parachute container cover and said ring, by the dropping carrier, said cover and the parachute, packed in said container and connected by the short string 141 to the inner side of the back wall 140 of said cover, are drawn away from the stationary member 131 of said parachute container, the light cord 139, laced through the eyelets 135 and 138 in the side walls and end walls of said stationary container member and said cover, respectively, breaking under the weight of the dropping carrier, whereupon the parachute 97, connected to the dropping carrier by means of its shroud lines 129, risers 125 and carrier harness 121, is drawn out of the container cover 132, by the dropping carrier, and the short string 141 is drawn taut, between the top of the parachute and the back wall 140 of said container cover and said string is broken, leaving the container cover 132 and connected static cord 142 hanging from the plane 34 by the ring 95 on the rear end of the guide rod 92, and as the carrier and released parachute 97 continue to drop through space, the parachute opens and causes the carrier 96 and the parachute 97 to descend slowly and safely to the ground.

The remaining carriers in the plane 34, forwardly of said rearmost carrier, successively follow said rearmost carrier out of the plane and drop successively through space, with their parachutes, to the ground, in the same manner as said rearmost carrier as above described, leaving their parachute container covers 132 and static cords 142 hanging from the plane by the rings 95 on the rear end portion of the guide rod 92 to which rings said static cords are respectively connected.

As above described the carriers 96 are delivered from the plane 34 by my mechanism, driven by the motor 53, but the carriers may be delivered from the plane without the use of the motor by inclining the forward end of the plane upwardly and swinging the operating lever 62, without closing the motor switch 72, sufficiently only to swing the lock arm 59 away from the motor pinion 57 so as to disengage the teeth 66 of said arm from the teeth 67 of said pinion and unlock said pinion, whereupon the carriers 96 will run rearwardly over the carrier mounting 1, out of the plane 34 through its open door 37 and over the apron 40, into space, as above described, the short prongs 107 of the carrier pusher catches 106 engaging the rollers 90 on chain studs 88 and moving the chain 87 rearwardly through the channels 11 and 24 in the carrier mounting sections 2 and 3, respectively; the chain 87 freely rotating the sprockets 51 and 84, and the gear 50; and said gear freely rotating the unlocked motor pinion 57, motor shaft 56 and motor armature, while the carriers 96 are being delivered from the plane.

In this specification and the annexed drawings I disclose my invention in one form which I consider desirable, but I do not limit my invention to such form, because it may be embodied in other forms, and it is to be understood that in and by the claims of this specification I intend to cover my invention in any form in which it may be embodied.

I claim:

1. In combination with an airplane and its cabin with a door in a side wall of said cabin at the rear of the wings of the plane, a plurality of parachute carriers movably mounted in said cabin one behind the other longitudinally of said cabin, parachutes connected to said carriers, respectively, means whereby said carriers may be conveyed longitudinally rearwardly and then laterally in the cabin out through said cabin door and dropped from the plane, and means whereby said parachutes are automatically opened when said carriers are dropped from the plane.

2. In combination with an airplane, a parachute carrier, a parachute container comprising a container member secured on said carrier and a container cover detachably mounted on said container member, a parachute enclosed in said container, a cord connecting the top of said parachute to the inside of said container cover, risers connected at one end to the shroud lines of said parachute with their other ends projecting out of said container, a harness in which said carrier is mounted with the upper ends of said harness connected to said other projecting ends of said risers, a static cord connected at one end to said container cover, a guide rod mounted in said plane and extending to a door in one side of the plane at the rear of the plane wings, and the rear end of said guide rod being secured to a fixed part in said plane, a ring connected to the other end of said static cord and slidable on said guide rod, and means whereby said carrier may be conveyed from said plane out through said door and dropped into space, while said static cord ring is drawn by the carrier and static cord to the rear secured end of said guide rod and said ring retained on said rear end of said guide rod.

3. In combination with an airplane, a parachute carrier mounting in said airplane extending rearwardly and then laterally in the plane to a door in a side wall of the plane at the rear of the plane wings, said mounting being formed with track grooves in its side walls, tracks in said grooves, carriers supported on rollers and fitted over said mounting with said rollers resting in said tracks, parachutes connected to said carriers, means whereby said carriers may be moved rearwardly over said mounting along said tracks out of said door, and dropped from the plane, and means whereby said parachutes are automatically opened when said carriers are dropped from the plane.

4. In combination with an airplane, a parachute carrier mounting in said airplane extending longitudinally rearwardly and then laterally in the plane to a door in a side wall of the plane at the rear of the wings of the plane, tracks extending along said mounting, a sprocket at each end of said mounting, an endless chain extending over said sprockets, a motor, means whereby one of said sprockets is driven by said motor to cause said chain to travel lengthwise of said mounting, carriers supported on rollers and fitted over said mounting with said rollers resting upon said tracks, interengaging means between said carriers and said chain whereby said carriers are moved rearwardly along said mounting out of said door and dropped from said plane, parachutes connected to said carriers, and means whereby said parachutes are automatically opened when said carriers are dropped from said plane.

5. In combination with an aircraft, a carrier mounting in said aircraft extending longitudinally rearwardly and then laterally to an opening in one side of said aircraft, said mounting being formed with track grooves in its sides, tracks in the lower and upper sides of said grooves, a carrier supported on rollers and constructed and arranged to fit over said mounting with said rollers fitted in said grooves and engaging said tracks, and a conveyor in said mounting whereby said carrier may be moved over said mounting along said tracks into or out of said aircraft through said opening in said aircraft.

6. In combination with an airplane, a carrier mounting in said airplane extending longitudinally in said plane to an opening in one side of said airplane at the rear of the wings of said plane, tracks on said mounting, sprockets journaled in said mounting, a chain extending over said sprockets, means whereby said sprockets are driven to cause said chain to travel over said sprockets, carriers supported on rollers and fitted over said mounting with said rollers resting upon said tracks, and interengaging means between said carriers and said chain whereby said carriers are moved by said chain along said tracks into or out of said airplane through said opening.

7. In combination with an airplane constructed with a door at the rear of the wings and at one side of the plane, a movable carrier element mounted in said airplane and extending longitudinally therein to said door, a carrier, and interengaging means between said carrier and said movable carrier element whereby said carrier is moved into or out of said airplane through said door by said movable carrier element, said interengaging means being constructed and arranged to automatically connect said carrier to, or disconnect said carrier from said movable carrier element, at said door in said airplane.

8. In combination with an airplane constructed with a door at the rear of the wings and at one side of the plane, sprockets journaled in said airplane with one of said sprockets adjacent said door, an endless chain extending over said sprockets, pins upstanding from said chain in suitably spaced relation, carriers constructed and arranged to extend over said chain and said sprocket adjacent said door, a pusher catch on each of said carriers for engaging or disengaging one of said pins on said chain, as said pin travels with said chain forwardly or rearwardly around said sprocket adjacent said door, and means for rotating one of said sprockets to cause said chain to travel forwardly or rearwardly around said sprockets.

9. In combination with an airplane, a front sprocket journaled in the forward part of the plane, a rear sprocket journaled adjacent a door in a side wall of the plane at the rear of the wings of the plane, an endless chain extending over said sprockets, a motor for driving one of said sprockets to cause said chain to travel over said sprockets lengthwise of the plane, carriers mounted on rollers in the plane, interengaging means between said carriers and said chain whereby said carriers are moved by said chain rearwardly in the plane and out of said door and dropped from the plane, parachutes connected to said carriers, and means whereby said parachutes are automatically opened when said carriers are dropped from the plane.

10. A mechanism as claimed in claim 9 including a motor circuit, and a lock constructed and arranged to lock the mechanism when said motor circuit is open or to unlock the mechanism when said motor circuit is either open or closed.

11. In combination with an airplane constructed with a door in one side thereof at the rear of the wings of the plane, a carrier mounting in the plane formed with a depressed channel extending longitudinally of the plane and curved at its rear end to said door, a sprocket at the forward end of said mounting and a sprocket at the rear end of said mounting adjacent said door, an endless chain extending over said sprockets with one reach of said chain extending through said channel, pins upstanding from said chain, means for driving one of said sprockets, carriers supported on rollers adapted to roll on said mounting, a pusher catch on each of said carriers for extending into said channel in said mounting and engaging or disengaging one of said pins on said chain, as said pin travels with said chain forwardly or rearwardly around said sprocket adjacent said door, parachutes connected to said carriers, and means whereby said parachutes are opened when said carriers pass out of the plane through said door and drop from the plane.

HARRY P. TRUSTY.